(12) United States Patent
Knoll et al.

(10) Patent No.: US 6,309,589 B1
(45) Date of Patent: Oct. 30, 2001

(54) METHOD FOR PRODUCING A PIN HEATER

(75) Inventors: Guenter Knoll, Stuttgart; Gert Lindemann, Lichtenstein; Wilfried Aichele, Winnenden; Friederike Lindner; Harry Schlachta, both of Gerlingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,320

(22) PCT Filed: Dec. 13, 1999

(86) PCT No.: PCT/DE99/03968

§ 371 Date: Oct. 12, 2000

§ 102(e) Date: Oct. 12, 2000

(87) PCT Pub. No.: WO00/35830

PCT Pub. Date: Jun. 22, 2000

(30) Foreign Application Priority Data

Dec. 16, 1998 (DE) .............................................. 198 57 958

(51) Int. Cl.$^7$ ................. B28B 1/24; B28B 3/00
(52) U.S. Cl. ............... 264/614; 264/618; 264/620; 264/642; 264/645
(58) Field of Search ..................................... 264/614, 618, 264/620, 642, 645

(56) References Cited

U.S. PATENT DOCUMENTS

| | | | |
|---|---|---|---|
| 2,102,301 | * 12/1937 | Arnold . | |
| 4,613,455 | * 9/1986 | Suzuki et al. | 252/516 |
| 5,736,095 | * 4/1998 | Shimada et al. | 264/614 |
| 5,993,722 | * 11/1999 | Radmacher | 264/442 |
| 6,143,238 | * 11/2000 | Konishi et al. | 264/614 |

FOREIGN PATENT DOCUMENTS

| | | |
|---|---|---|
| 35 19 437 | 12/1985 | (DE) . |
| 37 34 274 | 4/1988 | (DE) . |
| 0 601 727 | 6/1994 | (EP) . |
| 0 721 925 | 7/1996 | (EP) . |

\* cited by examiner

Primary Examiner—Christopher A. Fiorilla
(74) Attorney, Agent, or Firm—Kenyon & Kenyon

(57) ABSTRACT

A method is proposed for manufacturing a pin heater that has a substantially internal insulating layer and an external conductive layer, the two layers composed of a ceramic composite structure, wherein before the pin heater is sintered, its shaping is accomplished by way of the ceramic injection molding technique or by cold combined axial/isostatic pressing.

8 Claims, 5 Drawing Sheets

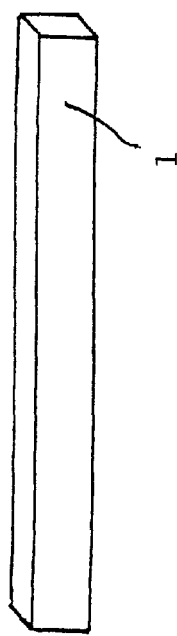
Fig. 1.1
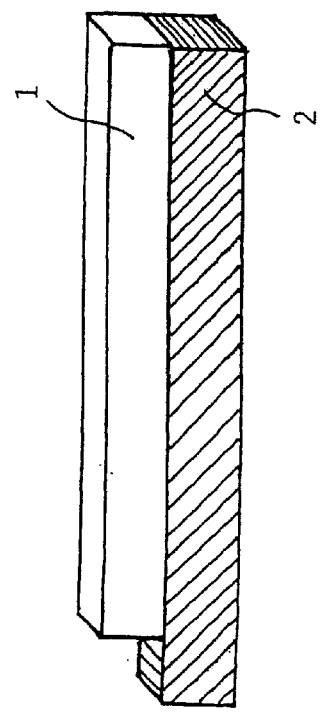
Fig. 1.2
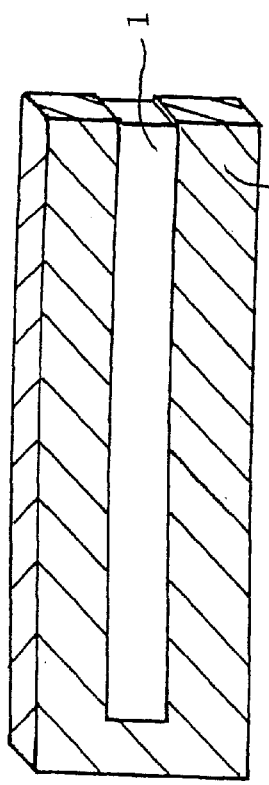
Fig. 1.3
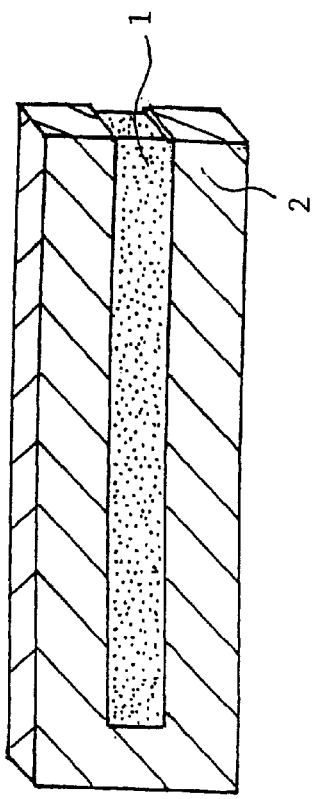
Fig. 1.4

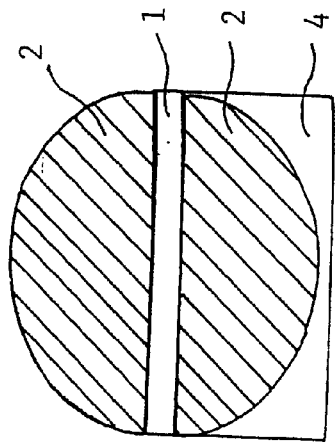
Fig. 3.4
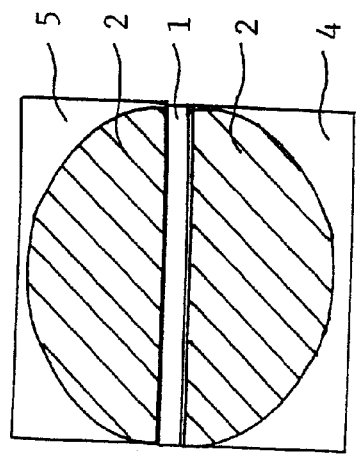
Fig. 3.5
Fig. 3.1
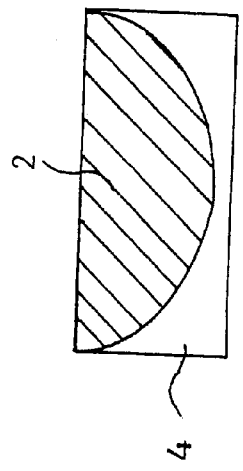
Fig. 3.2
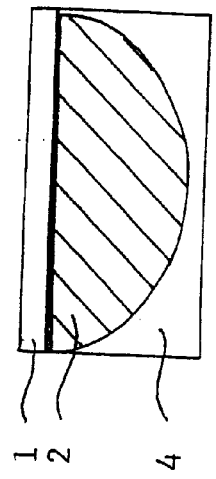
Fig. 3.3

METHOD FOR PRODUCING A PIN HEATER

This application is a 371 PCT/DE 99/03968 Dec. 13, 1999.

FIELD OF THE INVENTION

The invention relates to a method for manufacturing a pin heater that has a substantially internal insulating layer and an external conductive layer, the two layers comprising a ceramic composite structure.

BACKGROUND OF THE INVENTION

German Patent No. 35 19 437 and German Patent No. 37 34 274 have disclosed methods for manufacturing a pin heater from composite materials on the basis of trisilicon tetranitride ($Si_3N_4$) and molybdenum silicide ($MoSi_2$) using an axial hot pressing technique, with separate sintered-in power supply wires. The complex construction and laborious manufacturing method of these pin heaters, in which green machining of the pin (before sintering) is not possible, but rather only hard machining with diamond tools after sintering is possible, are regarded as disadvantageous.

European Patent No. 0 721 925 describes a method for manufacturing a dense silicon nitride composite material. Although this material is temperature-resistant, electrically conductive composites cannot be created using the manufacturing method.

European Patent No. 0 601 727 describes a method for manufacturing a pin heater from $Si_3N_4/MoSi_2$ composites. It can be manufactured by hot pressing or sintering under $10^5$ Pa of nitrogen at 1600° C. The composite material only begins to sinter at this temperature, resulting in relatively low strength values. This strength level is not sufficient for utilization of the pin heater, for example as a diesel starting aid. Complete sintering of the composite ceramic described is not possible under the manufacturing conditions indicated in European Patent No. 0 601 727. As a result, gas-tightness of the pins—which must exist if they are used, for example, as glow plugs—is also not ensured.

German Patent Application No. 197 22 321 describes a method for manufacturing a shaped element having adjustable electrical conductivity from a ceramic composite structure that contains at least two constituents of differing electrical conductivity, such as $Si_3N_4$ and a metal silicide, the shaped element being produced before sintering by way of a cold isostatic mold pressing step. A method for manufacturing a pin heater is not, however, recited therein.

SUMMARY OF THE INVENTION

It is the object of the present invention to make available a method for manufacturing a pin heater that has a substantially internal insulating layer and an external conductive layer, that heats up quickly, that has excellent thermal and mechanical load-bearing capability at up to at least 1400° C., and that is gas-tight. In addition, heating rates of greater than or equal to 300 K/s to 900° C. are intended to be achievable, after application of a voltage of 10–15 V, with the pin heater manufactured according to the present invention. Above 1400° C., the pin heater is to exhibit modulation behavior. In addition, the power consumption of the pin heater manufactured in this fashion should not exceed 120 W in the initial phase.

According to the present invention, the object is achieved by a method for manufacturing a pin heater that has a substantially internal insulating layer and an external conductive layer, the two layers comprising a ceramic composite structure, wherein before the pin heater is sintered, its shaping is accomplished by way of the ceramic injection molding technique or by cold combined axial/isostatic pressing.

In an advantageous embodiment of the method, trisilicon tetranitride and a metal silicide are used as constituents of the ceramic composite structure.

Particularly advantageous in this context is a method in which 30–70 wt % $Si_3N_4$, 25–65 wt % $MoSi_{21}$, 0–5 wt % $Al_2O_3$, and 2–9 wt % $Y_2O_3$ are used as constituents of the ceramic composite structure.

The manufacture of a fast-heating pin heater with high strength includes the stage of shaping it and that of sintering it.

Shaping can be accomplished by way of the ceramic injection-molding technique, or by cold combined axial/isostatic pressing.

1. Shaping by CIM (Ceramic Injection Molding) In this technique, a preconditioned $Si_3N_4$ powder equipped with corresponding sintering additives, such as $Al_2O_3$ and $Y_2O_3$, is produced. This powder contains 0–5 wt %, advantageously 4.3 wt %, $Al_2O_3$ and 2–9 wt %, advantageously 5.7 wt %, $Y_2O_3$. $MSi_2$ is mixed into this, wherein M can be molybdenum, niobium, tungsten, and titanium at various proportions by weight.

The admixture of $MSi_2$ is performed in such a way that after sintering, a highly insulating component and a very conductive component are created. The $MoSi_2$ concentration contained in the insulating component is in the range of 25–45 wt %, and in the conductive component is 50–65 wt %.

This is followed by the preparation of injection-moldable polymer compounds from the two components, i.e., ready-to-process mixtures of polymers with all the additives and fillers that are necessary for the manufacture of final products. These compounds are produced from the two preconditioned ceramic powder mixtures with a suitable organic binder system that, according to the present invention, has grafted polypropylenes in combination with cyclododecane and/or cyclododecanol. Also suitable as binder systems for producing the injection-moldable compounds are combinations of polyolefin waxes such as Hostamont® TPEK 583 of Ticona GmbH, or polyoxymethylenes such as Catamold® of BASF AG.

Injection-moldable powder compounds constitute highly filled dispersions. A binder system suitable for powder injection molding must meet the following requirements:

- dispersive effect to prevent powder agglomerates;
- good flow characteristics for the molten compound during injection molding;
- sufficient adhesion (welding) when a second compound is overmolded onto a preform;
- low level of pyrolysis carbon generation during thermal binder removal in an inert gas atmosphere or in air, since carbon has a deleterious effect on the properties of the sintered shaped element; and
- rapid binder removal with no defect formation.

One such binder system is constituted by, for example, the combination of grafted polypropylenes with cyclododecane and/or cyclododecanol. The polar compounds grafted onto the polypropylene chain, such as acrylic acid or maleic acid anhydride, bind to the surfaces of the powder.

Lastly, the insulating element is injection-molded using the compound containing the insulating component. This insulating element is overmolded with the compound containing the conductive component by injection-bonding, resulting in welding of the two subelements. It is also possible to proceed in the opposite fashion.

It is particularly advantageous to injection-mold the insulating and conductive layers constituting the pin heater by two-component injection molding.

This is followed by an advantageously thermal binder removal process, and presintering under inert gas at $10^5$ Pa at up to 1200° C.

2. Shaping by Cold Combined axial/isostatic Pressing

Shaping by cold combined axial/isostatic pressing can be performed using the two methods described below.

Method 2.1

First a preconditioned $Si_3N_4$ powder is produced. This contains sintering additives such as $Al_2O_3$ and $Y_2O_3$. $MSi_2$, in which M can be molybdenum, niobium, tungsten, or titanium at various proportions by weight, is mixed into the powder. Organic pressing and/or binding auxiliaries, such as polyvinyl butyrals, polyvinyl alcohols, polyvinyl acetates, or polyethylene glycols, are also optionally added in an attrition mill in an organic solvent such as ethanol, propanol, or isopropanol. The preconditioned $Si_3N_4$ powder contains 0–5 wt %, advantageously 4.3 wt %, $Al_{2O3}$, and 2–9 wt %, advantageously 5.7 wt %, $Y_2O_3$.

The attrition-milled suspension is then dried in a rotary evaporator. Admixture of the $MSi_2$ is performed in such a way as to create one component that is highly insulating after sintering, and one component that is highly conductive after sintering. The former component contains, for example, $MoSi_2$ concentrations in the range of 25–45 wt %, and the latter component contains, for example, $MoSi_2$ concentrations in the range of 50–65 wt %.

The heater is manufactured in such a way that first, a parallelepipedal compact of the insulating component is axially prepressed at a low pressure in an axial pressing mold. Then a portion of the conductive component is placed as a bulk powder into a further axial pressing mold with a parallelepipedal profile, whose dimension on the narrow side transverse to the pressing direction is approximately 2–5% greater than the first pressing mold. The rectangularly prepressed part is then placed into the bulk powder of the conductive component so as to create on one side a flush termination and on the other side a clearance to be filled with a second portion of the conductive component. The aforementioned portion is then added, and the layered composite is axially prepressed at a pressure of $4 \times 10^7$ Pa. That is followed by cold isostatic final pressing of the layered composite at 200 MPa. Lastly, the completely pressed layered composite is shaped into a rotationally symmetrical element by profile grinding or lathe-turning, before or after binder removal and/or presintering in argon at $10^5$ Pa and 1200° C.

Method 2.2

A precontoured, approximately rotationally symmetrical heater is configured, by the fact that a parallelepipedal compact of the insulating component is axially predensified at a low pressure. Then an axial pressing mold with a concavely shaped lower die is filled with a bulk powder of the conductive component. The prepressed part made of the insulating component is then placed on top so that the prepressed part terminates flush on one side and on the other side a cavity is created, whereupon the mold is once again filled with the conductive component. This layered composite is pressed together, using a concavely shaped upper die, at a pressure of $4 \times 10^7$ Pa.

This pressing operation is followed by cold isostatic pressing of the layered composite at a pressure of $2 \times 10^8$ Pa.

The heater is then subjected to binder removal and/or presintered in inert gas at $10^5$ Pa at up to 1200° C.

This operation is followed by profile grinding or lathe-turning of the heater down to the final geometry.

3. Sintering Methods

All of the shaping processes are followed, after binder removal and/or presintering, by a main sintering step, which can be accomplished in the two ways described below.

Main sintering process (1) is accomplished under a defined $N_2$ partial pressure, this lying, in the sintering gas, between 1000° C. and the sintering temperature, which is no greater than 1900° C. The $N_2$ partial pressure does not exceed $10^6$ Pa, and the total sintering pressure is elevated to values of up to $10^7$ Pa by the admixture of an inert gas, for example argon.

Main sintering process (2) is accomplished under a defined $N_2$ partial pressure which must be varied with temperature in such a way that the partial pressure lies within a range that is defined by the following functions, and the total sintering pressure is elevated to values of up to $10^7$ Pa by the admixture of an inert gas, for example argon.

upper limit: $\log p(N_2) = 7.1566 \ln(T) - 52.719$ lower limit: $\log p(N_2) = 9.8279 \ln(T) - 73.988$.

The unit of T is ° C., and the unit of $p(N_2)$ is $10^5$ Pa. The sintering temperature is no greater than 1900° C.

The composites obtained by way of the method according to the present invention achieve densities greater than 95% of the material density, and exhibit the strength values summarized in the following Table.

TABLE

Four-point flexural strength values measured at 25° C. and 1000° C., and at 25° C. after aging at 1300° C. in air

| Measurement conditions: Measurement temperature/aging | σ 4-pt. (MPa $Si_3N_4$) with 30 wt % $MoSi_2$ | σ 4-pt. (MPa $Si_3N_4$) with 50 wt % $MoSi_2$ | σ 4-pt. (MPa $Si_3N_4$) with 70 wt % $MoSi_2$ |
|---|---|---|---|
| 25° C./none | 550 | 486 | 414 |
| 25° C./250 h at 1300° C. in air | 455 | 444 | 330 |
| 25° C./500 h at 1300° C. in air | 400 | 380 | 311 |
| 25° C./1000 h at 1300° C. in air | 502 | 465 | 374 |
| 1000° C./none | 510 | 420 | 350 |

The rotationally symmetrical ceramic pin heaters manufactured according to the present invention have a high thermal and mechanical load capacity at up to at least 1400° C., and are gas-tight. With these ceramic heaters, heating rates greater than or equal to 300 K/s to 900° C. can be achieved with the application of 10–15V. They exhibit modulating behavior above 1400° C. The power consumption of the heater in the initial phase does not exceed 100 W.

These advantages of the pin heater manufactured by the method according to the present invention, as compared to pin heaters according to the existing art, are also made possible by the use of an inert gas sintering method which allows a greater design freedom as compared to axially hot-pressed composite elements. Because of the ability to achieve the requisite geometry of the pin heater on a near-net-shape basis either by green machining or by the use of special pressing molds or by injection molding, the laborious hard machining that is necessary in the case of a pin heater produced by hot pressing is unnecessary.

BRIEF DESCRIPTION OF THE DRAWINGS

FIG. 1.1 shows the parallelepipedally prepressed insulating component according to the present invention.

FIG. 1.2 shows the placement of the insulating component illustrated in FIG. 1.1 on a parallelepipedal bulk powder bed of the conductive component according to the present invention.

FIG. 1.3 shows the mold filled with the conductive component according to the present invention.

FIG. 1.4 shows the cold isostatic densification according to the present invention.

FIG. 3.1 shows, in a schematic depiction, the prepressed insulating component according to the present invention.

FIG. 3.2 shows a lower die of concave configuration that is filled with conductive component according to the present invention.

FIG. 3.3 shows insulating component being placed onto conductive component according to the present invention.

FIG. 3.4 shows further addition of conductive component according to the present invention.

FIG. 3.5 additionally shows the upper die according to the present invention.

DETAILED DESCRIPTION

FIG. 1.1 shows the parallelepipedally prepressed insulating component 1, and FIG. 1.2 shows the placement of that component 1 on a parallelepipedal bulk powder bed of conductive component 2. FIG. 1.3 shows the mold filled with conductive component 2, and FIG. 1.4 the cold isostatic densification.

Figure 2:
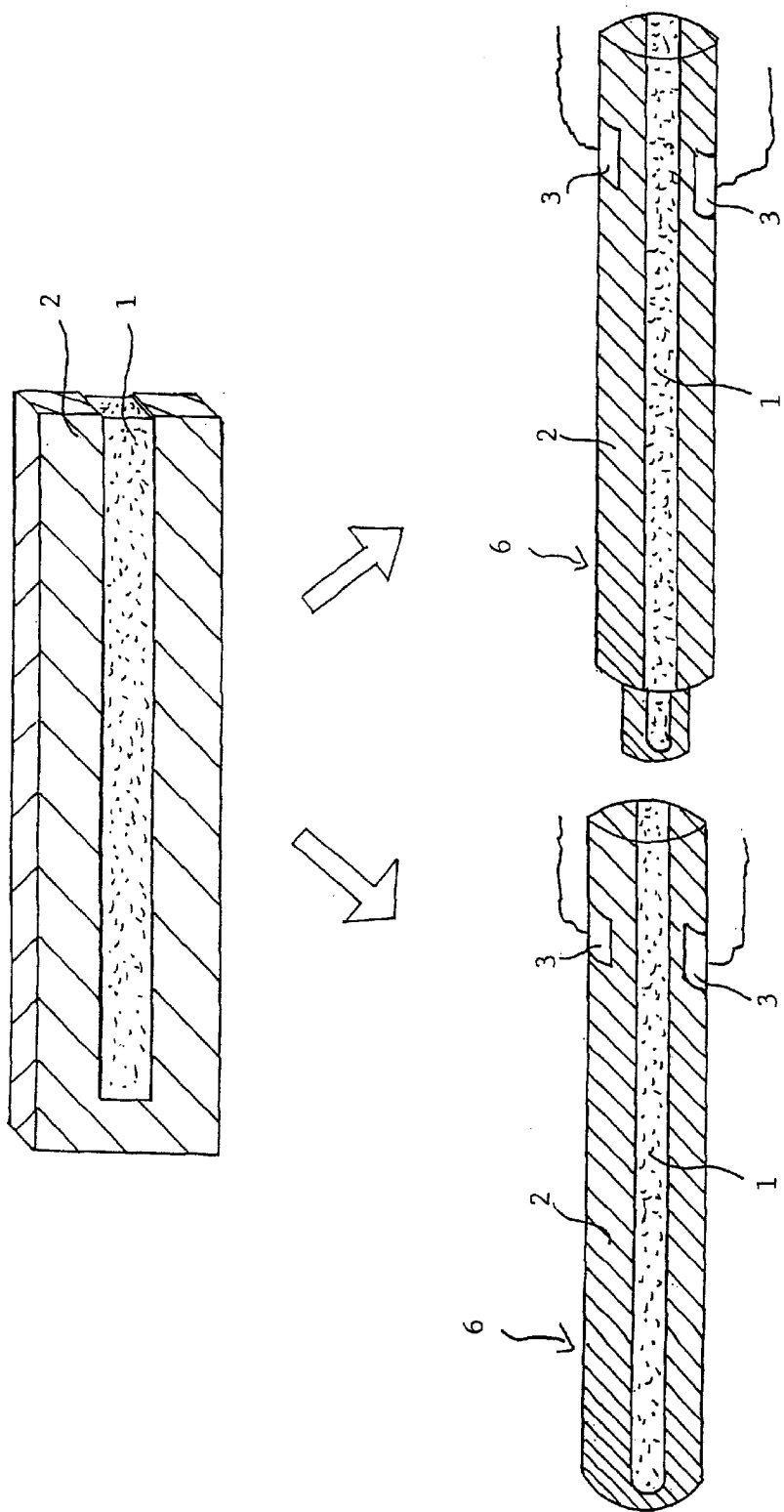
FIG. 2 shows the step in which the pin heater is shaped according to the present invention.
Figure 4:
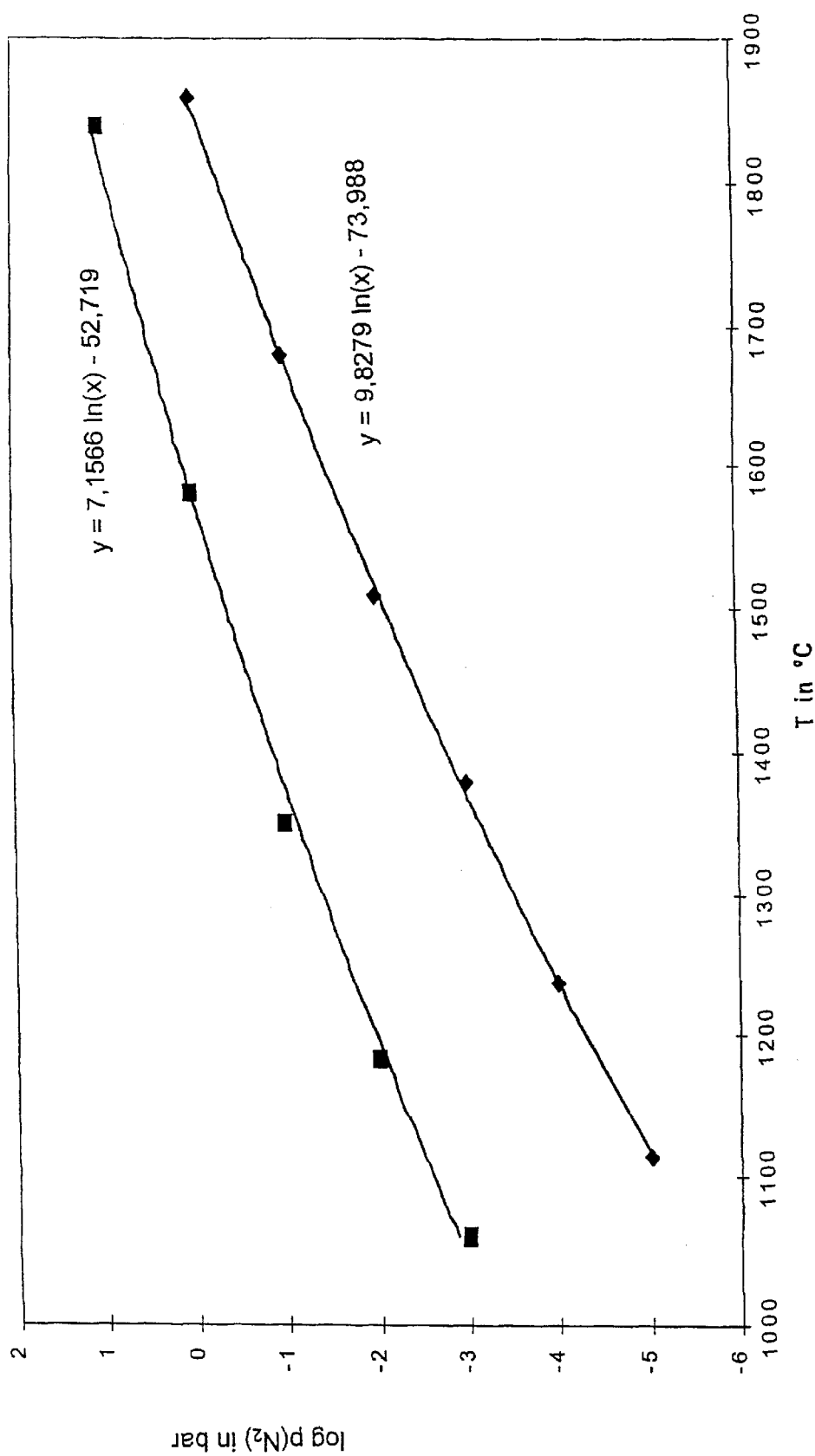
FIG. 4 shows a depiction of the pressing range as defined by main sintering process (2), which must be set as a function of temperature in the manufacture of special conductive $Si_3N_4/MoSi_2$ composites.

FIG. 2 shows the step for shaping pin heater 6 according to the present invention, which is performed by profile grinding or lathe-turning. Pin heater 6 has an outer conductive layer made of conductive component 2, and a substantially internal insulating layer made of insulating component 1. The conductive layer is equipped with contacting 3. FIG. 2 also shows two differently shaped embodiments of pin heater 6 according to the present invention.

FIG. 3.1 shows, in a schematic depiction, the prepressed insulating component 1. FIG. 3.2 shows a lower die 4 of concave configuration that is filled with conductive component 2. FIG. 3.3 shows insulating component 1 being placed onto component 2. FIG. 3.4 shows further addition of component 2, and FIG. 3.5 additionally shows upper die 5.

Description of Exemplary Embodiments

Example 1

To manufacture a compound from conductive component 2, 82 wt % of the preconditioned powder mixture of conductive component 2 was kneaded with 12 wt % Polybond® 1001 and 6 wt % cyclododecane under inert gas at 180° C., and granulated by cooling as the kneader continued to run. The Polybond® 1001 polypropylene used was a homopolypropylene grafted with 6% acrylic acid, of Uniroyal Chemical.

In the same manner, a compound was produced with insulating component 1, its filler content being adapted to that of the compound with conductive component 2 in such a way that specimens of the two compounds that were injection-molded and had the binder removed under identical sintering conditions exhibited the same shrinkage upon sintering. This was achieved, for example, by the fact that the compound with insulating component 1 was made of 83 wt % of the preconditioned powder of that component 1, 11 wt % Polybond®, and 6 wt % cyclododecane.

The subelements of pin heater 6 were shaped by composite injection molding from the compound of insulating component 1 and the compound of conductive component 2, and thereby welded to one another. The configuration selected for the injection mold governs which of the two components is injection-molded first.

After thermal binder removal and sintering as defined in main sintering process (2), the compound containing insulating component 1 has a specific resistance of $10^7$ Ωcm, and the compound containing conductive component 2 has a specific resistance of $6 \times 10^{-3}$ Ωcm.

Example 2

An insulating component 1 comprising 54 wt % $Si_3N_4$, 2.58 wt % $Al_2O_3$, 3.42 wt % $Y_2O_3$, and 40 wt % $MoSi_2$ was produced, the average particle size of the $Si_3N_4$ used being 0.7 μm, and that of the $MoSi_2$ 1.8 μm. After the addition of 0.5 wt % of a polyvinyl butyral pressing auxiliary, component 1 was prepressed at 30 MPa in an axial pressing mold, and was placed in a second pressing mold on a bulk powder bed of conductive component 2 as shown in FIG. 1.2. Conductive component 2 included 36 wt % $Si_3N_4$, 1.72 wt % $Al_2O_3$, 2.28 wt % $Y_2O_3$, and 60 wt % $MoSi_2$. The average particle size of the $Si_3N_4$ used was 0.7 μm, that of the $MoSi_2$ 1.8 μm. 0.5 wt % polyvinyl butyral was also added to conductive component 2. After the prepressed insulating component 1 had been set in place, the mold was filled with conductive component 2 and a layered composite was produced by axial pressing. The layered composite of the two components 1 and 2 was subjected to final cold isostatic densification at a pressure of 200 MPa. After a presintering firing at 1200° C., the layered composite was machined by lathe-turning into a rotationally symmetrical element. Sintering was performed as defined in main sintering process (1), the total pressure of the sintering gas being $10^6$ Pa, and a four-hour sintering phase at 1800° C. being utilized. After sintering, insulating component 1 had a specific electrical resistance of $1 \times 10^7$ Ωcm, and conductive component 2 had a resistance of $4 \times 10^{-4}$ Ωcm at room temperature.

Example 3

Insulating component 1, which comprised 58.5 wt % $Si_3N_4$, 2.79 wt % $Al_2O_3$, 3.70 wt % $Y_2O_3$, and 35 wt % $MoSi_2$, the average particle size of the $Si_3N_4$ used being 0.7 μm and that of the $MoSi_2$ 1.8 μm, was predensified at 30 MPa following the addition of 0.5 wt % polyvinyl butyral as pressing auxiliary, as described in Example 2. Conductive component 2, comprising 45.0 wt % $Si_3N_4$, 1.94 wt % $Al_2O_3$, 2.57 wt % $Y_2O_3$, and 50 wt % $MoSi_2$, the average particle size of the $Si_3N_4$ used being 0.7 μm and that of the $MoSi_2$ 1.8 μm, was placed into an axial pressing mold having a concavely shaped lower die 4. The prepressed insulating component 1 was then laid on top, further powder of conductive component 2 was added, and axial predensification and cold isostatic final densification were performed with a concavely shaped upper die 5. Sintering was accomplished as defined in main sintering process (2), the total pressure during the sintering phase being $10^6$ Pa, and a four-hour sintering phase being performed at 1800° C. After sintering, insulating component 1 had a specific electrical resistance of $1 \times 10^8$ Ωcm, and conductive component 2 had a resistance of $6 \times 10^{-3}$ Ωcm, at room temperature.

Figure 5:
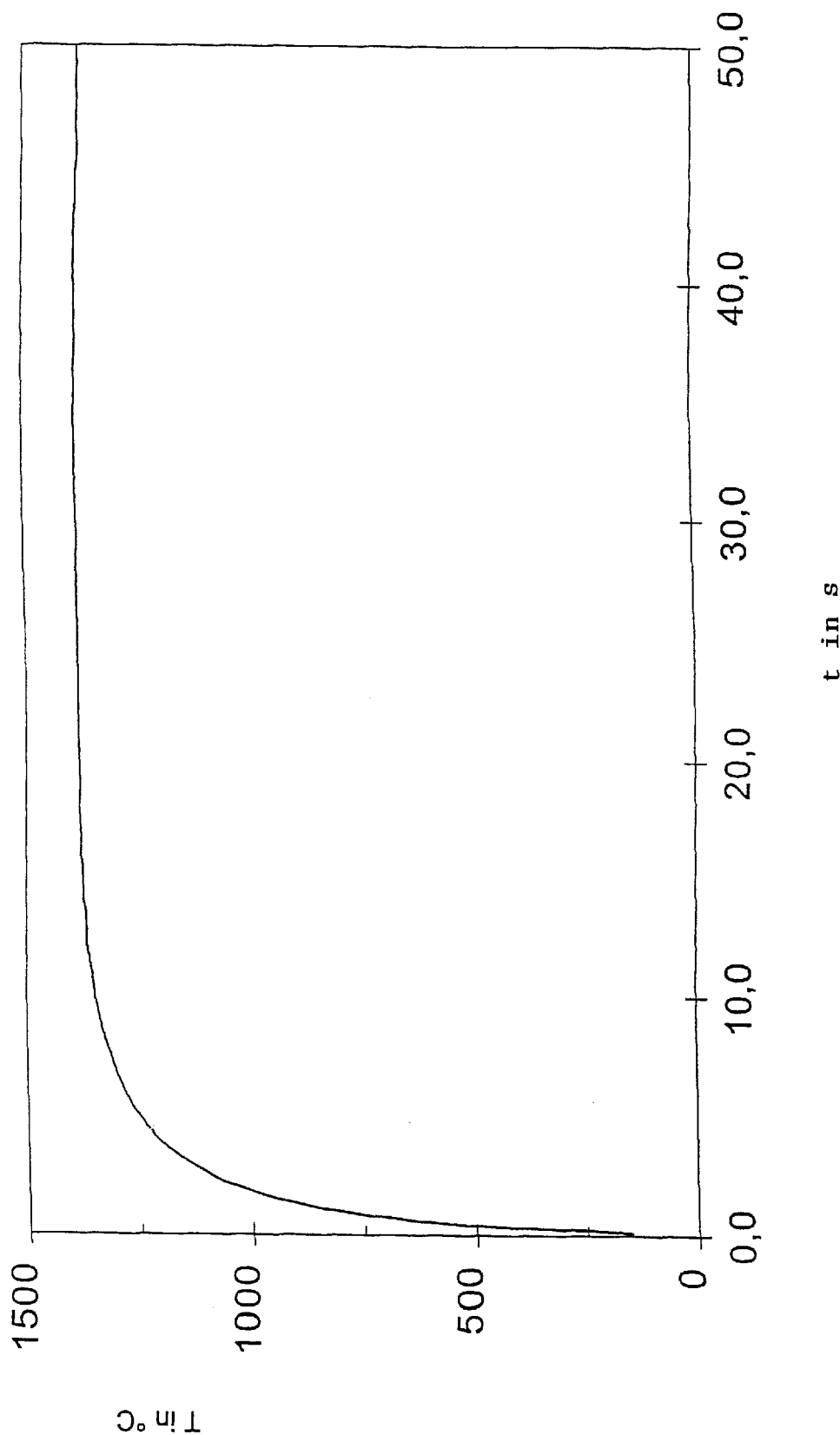
FIG. 5 shows the heating characteristics of the ceramic pin heater manufactured according to the present invention as exemplified by Example 1.

FIG. 5 shows a temperature/time curve for the pin heater manufactured according to this Example, following application of a voltage of 11 V. The resistance was 1.2 Ω, amperage initially approximated 8 A and finally 4.4 A, temperature T 1037° C. after 2 seconds, and maximum temperature 1383° C., a temperature of 950° C. being reached after 1.6 seconds.

What is claimed is:

1. A method for manufacturing a pin heater having a ceramic composite structure including a substantially internal insulating layer and an external conductive layer, the method comprising:

shaping the pin heater by way of a ceramic injection molding technique or by cold combined axial/isostatic pressing;

after the pin heater has been shaped, sintering the pin heater.

2. The method according to claim 1, wherein trisilicon tetranitride and a metal silicide are used as constituents of the ceramic composite structure.

3. The method according to claim 2, wherein the ceramic composite structure includes 30–70 wt % $Si_3N_4$, 25–65 wt % $MoSi_2$, 0–5 wt % $Al_2O_3$, and 2–9 wt % $Y_2O_3$.

4. A method for manufacturing a pin heater having a ceramic composite structure including a substantially internal insulating layer and an external conductive layer, the method comprising:

producing an insulating ceramic powder mixture that will become an insulating component of the composite structure after sintering wherein a metal silicide content in the insulating component is 25–45 wt %;

producing a conductive ceramic powder mixture that will become a conductive component of the composite structure after sintering wherein the metal silicide content in the conductive component is 50–65 wt %;

mixing the insulating ceramic powder mixture with a first binder system to produce an insulating injection-moldable mixture;

mixing the conductive ceramic powder mixture with a second binder system to produce a conductive injection-moldable mixture;

injecting the insulating injection-moldable mixture and the conductive injection-moldable mixture to form the insulating layer and the conductive layer by two-component injection molding;

binder removal processing and presintering of the layered composite structure; and main sintering of the layered composite structure.

5. The method according to claim 4, wherein the first and second binder systems include polyolefin waxes, polyoxymethylenes, or grafted polypropylenes in combination with at least one of cyclododecane and cyclododecanol.

6. A method for manufacturing a pin heater having a ceramic composite structure including a substantially internal insulating layer and an external conductive layer, the method comprising:

producing an insulating ceramic powder mixture that will become an insulating component of the composite structure after sintering wherein a metal silicide content in the insulating component is 25–45 wt %;

producing a conductive ceramic powder mixture that will become a conductive component of the composite structure after sintering wherein the metal silicide content in the conductive component is 50–65 wt %;

axial prepressing of the insulating ceramic powder mixture;

producing a layered composite structure from the axially prepressed insulating ceramic powder mixture and the conductive ceramic powder mixture;

axial prepressing of the layered composite structure;

cold isostatic final pressing of the layered composite structure;

profile grinding or lathe-turning of the layered composite structure before or after at least one of binder removal processing and presintering of the layered composite structure; and main sintering of the layered composite structure.

7. The method according to claim 6, wherein axial prepressing is performed by an axial pressing mold with parallelepipedal geometry.

8. The method according to claim 6, wherein axial prepressing is performed by an axial pressing mold including a concavely shaped pressing die.

* * * * *